United States Patent
Ripolone et al.

(10) Patent No.: US 7,230,541 B2
(45) Date of Patent: Jun. 12, 2007

(54) HIGH SPEED COMMUNICATION FOR MEASUREMENT WHILE DRILLING

(75) Inventors: James G. Ripolone, Tomball, TX (US); Sascha Schwarze, Espelkamp (DE); Frank Wiese, Lachendorf (DE)

(73) Assignee: Baker Hughes Incorporated, Houston, TX (US)

( * ) Notice: Subject to any disclaimer, the term of this patent is extended or adjusted under 35 U.S.C. 154(b) by 748 days.

(21) Appl. No.: 10/716,807

(22) Filed: Nov. 19, 2003

(65) Prior Publication Data

US 2005/0104743 A1 May 19, 2005

(51) Int. Cl.
*G01V 3/00* (2006.01)

(52) U.S. Cl. .............. 340/853.2; 340/855.8; 166/65.1

(58) Field of Classification Search ......... 340/853.2, 340/855.8, 854.3, 855.5, 855.4; 166/65.1
See application file for complete search history.

(56) References Cited

U.S. PATENT DOCUMENTS

| | | | | |
|---|---|---|---|---|
| 5,691,712 | A * | 11/1997 | Meek et al. | 340/853.3 |
| 2002/0101359 | A1 | 8/2002 | Huckaba et al. | 340/854.9 |
| 2002/0140572 | A1 | 10/2002 | Gardner et al. | 340/853.3 |
| 2003/0010492 | A1 * | 1/2003 | Hill et al. | 166/65.1 |
| 2003/0011489 | A1 | 1/2003 | Viswanathan | 340/853.1 |
| 2005/0046592 | A1 * | 3/2005 | Cooper et al. | 340/855.7 |

OTHER PUBLICATIONS

Link Street, 6-Port Fast Ethernet Switch, 88E6060-001 Nov. 2002; 2 pages.
Infineon technologies; Tool Brief; 10 BaseS 22822; 10 BaseS Demonstration Board, package V1.0; 2 pages.
Infineon technologies; 10 BaseS 22822; Getting Started; Feb. 22, 2001; 2 pages.
Howstuffworks "How VDSL Works"; 6 pages.

* cited by examiner

*Primary Examiner*—Timothy Edwards, Jr.
(74) *Attorney, Agent, or Firm*—Cantor Colburn LLP (57) ABSTRACT

A communication system for communication with a downhole tool comprising: a first communication transceiver in a first tool for measurement while drilling and a second communication transceiver in at least one of the first tool, a second tool for measurement while drilling, and an external instrumentation interface. The communication system also includes a bus system comprising a first conductive connection and a second conductive connection in each of the first tool and at least one of the first tool, a second tool and an external instrumentation interface, said first conductive connection and the second conductive connection of the first tool in operable communication with the first communication transceiver and the first conductive connection and the second conductive connection of the at least one of the first tool, a second tool and an external instrumentation interface also in operable communication with the second communication transceiver.

49 Claims, 4 Drawing Sheets

HIGH SPEED COMMUNICATION FOR MEASUREMENT WHILE DRILLING

BACKGROUND

The present inventions relate generally to high-speed digital data communications for use in downhole Measurement While Drilling (MWD) tools. More specifically, the invention relates to a high-speed communications scheme for transferring data between downhole sensors and related electronics. More specifically still, the invention relates to a downhole tool communication system using Quadrature Amplitude Modulation (QAM) or Discrete Multi-Tone (DMT) communication for data streams between or inside drill collars or for communication with external equipment.

Modern petroleum drilling and production operations demand a great quantity of information relating to parameters and conditions downhole. Such information typically includes characteristics of the earth formations traversed by the wellbore, data relating to the size and configuration of the borehole itself, as well as environmental factors such as temperatures, flow, pressures and the like. The collection of information relating to conditions downhole, which commonly is referred to as "monitoring" or "logging", can be performed by several methods.

In conventional oil well wireline logging, a probe or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

An alternative method of monitoring and logging is the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing drilling down time. Halting drilling for monitoring purposes can be extremely costly.

Designs for measuring conditions downhole including the movement and location of the drilling assembly contemporaneously with the drilling of the well have come to be known as "measurement while drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

Sensors or transducers typically are located at the lower end of the drill string in MWD systems. While drilling is in progress these sensors continuously or intermittently monitor predetermined drilling parameters and formation data and may transmit information to a surface detector by some form of telemetry. Typically, the downhole sensors employed in MWD applications are positioned in one or more cylindrical drill tool/s that is/are positioned close to the drilling bit. The MWD system then employs a system of telemetry in which the data acquired by the sensors is transmitted to a receiver located on the surface.

There are a number of telemetry systems in the prior art, which seek to transmit information regarding downhole parameters up to the surface. Acoustic telemetry using a mud pulse system is one of the most widely used telemetry systems for MWD applications. The mud pulse system of telemetry creates "acoustic" pressure signals in the drilling fluid that is circulated under pressure through the drill string during drilling operations. The information that is acquired by the downhole sensors is transmitted by suitably timing the formation of pressure pulses in the mud stream. The information is received and decoded by a pressure transducer and computer at the surface.

In addition, when multiple tools may be employed, communication between tools becomes beneficial. Existing methods of communication between tools are often slow and bandwidth limited based on the limited interconnections and noisy environment in close proximity to the drill and other tools. Therefore, what is needed in the art is a wider bandwidth means of communicating between tools without adding additional contacts.

BRIEF SUMMARY

The above-discussed and other drawbacks and deficiencies of the prior art are overcome or alleviated by the communication system disclosed herein for communication with a downhole tool comprising: a first communication transceiver in a first tool for measurement while drilling and a second communication transceiver in at least one of the first tool, a second tool for measurement while drilling, and an external instrumentation interface. The communication system also includes a bus system comprising a first conductive connection and a second conductive connection in each of the first tool and at least one of the first tool, a second tool and an external instrumentation interface, said first conductive connection and the second conductive connection of the first tool in operable communication with the first communication transceiver and the first conductive connection and the second conductive connection of the at least one of the first tool, a second tool and an external instrumentation interface also in operable communication with the second communication transceiver. The first communication transceiver and said second communication transceiver employ at least one of Quadrature Amplitude Modulation (QAM) and Discrete Multi-Tone (DMT) modulation. The bus system carries a combined communications signal including at least one of a modulated communication signal, a power signal, and an existing communications signal.

Also disclosed herein in another exemplary embodiment is a method for communication with a downhole tool comprising: formulating a combined communications signal; transmitting and receiving a communication signal with a first communication transceiver in a first tool for measurement while drilling and a second communication transceiver in at least one of said first tool, a second tool for measurement while drilling, and an external instrumentation interface. The method further includes utilizing a bus system comprising a first conductive connection and a second conductive connection in each of the first tool and at least one of the first tool, a second tool and an external instrumentation interface, the first conductive connection and the second conductive connection of the first tool in operable communication with the first communication transceiver and the first conductive connection and the second conductive connection of at least one of the first tool, a second tool and an external instrumentation interface also in operable communication with the second communication transceiver. The first communication transceiver and the second communication transceiver employ at least one of Quadrature Amplitude Modulation (QAM) and Discrete Multi-Tone (DMT) modulation. The combined communication signal includes at least one of a modulated communications signal, a power signal, and an existing communications signal.

Further disclosed herein in an exemplary embodiment is a storage medium encoded with a machine-readable computer program code, the code including instructions for causing a computer to implement the abovementioned method for communication with a downhole tool.

Further disclosed herein in yet another exemplary embodiment is a computer data signal: the computer data signal comprising code configured to cause a processor to implement the abovementioned method for communication with a downhole tool.

Also disclosed herein is a system for communication with a downhole tool comprising: a means for formulating a combined communications signal; a means for transmitting and receiving a communication signal with a first communication transceiver in a first tool for measurement while drilling and a second communication transceiver in at least one of the first tool, a second tool for measurement while drilling, and an external instrumentation interface. The system also includes a means for utilizing a bus system comprising a first conductive connection and a second conductive connection in each of the first tool and at least one of the first tool, a second tool and an external instrumentation interface, the first conductive connection and the second conductive connection of the first tool in operable communication with the first communication transceiver and the first conductive connection and the second conductive connection of at least one of the first tool, a second tool and an external instrumentation interface also in operable communication with the second communication transceiver. The first communication transceiver and the second communication transceiver employ at least one of Quadrature Amplitude Modulation (QAM) and Discrete Multi-Tone (DMT) modulation. The combined communication signal includes at least one of a modulated communications signal, a power signal, and an existing communications signal.

BRIEF DESCRIPTION OF THE DRAWINGS

These and other objects and advantages of the present invention may be best understood by reading the accompanying detailed description of the exemplary embodiments while referring to the accompanying figures wherein like elements are numbered alike in the several figures in which.

The detailed description explains the preferred embodiments of our invention, together with advantages and features, by way of example with reference to the drawings.

DETAILED DESCRIPTION OF THE EXEMPLARY EMBODIMENTS

Figure 1:
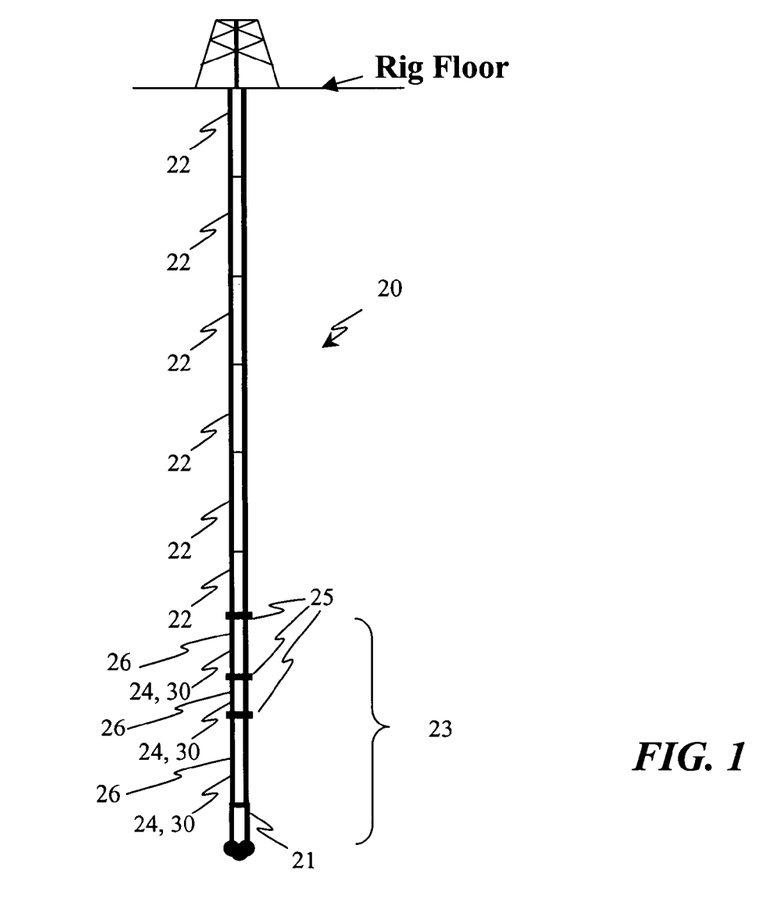
FIG. 1 is a diagrammatic view depicting a drill string for implementation of an exemplary embodiment.

Referring to FIG. 1, a simplified block diagram illustrating a portion of a MWD/LWD drill string 20. The drill string 20 includes various numbers of drill pipes 22, and a drill 21. The string 20 further includes, but is not limited to, a down hole assembly 23 comprising one or more drill collars 24, and various drilling support apparatus, e.g. stabilizers and the like. A drill collar 24 hereinafter referred to as collar 24, comprises a section of heavy walled pipe 26 with a drill collar joint 25 at each end of the section of pipe 26. Various drill collars 24 are connected using drill collar joints 25 with box type and pin type threads (not shown). The mating faces of each collar 24 at the drill collar joints 25 (one at each end of the drill collar 24) may contain a conductive ring 28 that is insulated from the heavy walled pipe 26. A drill collar 24 may or may not include a tool 30 and/or one or more conductive contact ring(s) 28. It will be appreciated that a drill collar 24 may include multiple tools 30 as well as portions of tools 30. It will further be appreciated that as used herein a tool 30 is part of a drill collar 24, tool 30 has been utilized herein for simplicity. To further simplify discussion of the exemplary embodiments, as described herein, a single drill collar 24 includes a single tool 30, however other configurations are possible.

The figure provides a diagrammatic depiction of a drill string 20 with three drill collars 24 including three tools 30 denoted as tool A 30a, tool B 30b, and tool C 30c, with pipes 26 and the joints 25 of three drill collars 24 is depicted (two between adjacent tools 30 and one with a drill pipe 22).

The conductive contact ring 28 is conductively coupled to a conductor capable of electrical communication along the length of the drill collar and/or tool 30 to form a portion of a bus system 40 for the tool(s) 30. In an exemplary embodiment, a preferred form of the bus 40 includes a single wire with the pipe 26 acting as return and carries both power and a communication signal among the various tool(s). In a preferred form, the contact ring contains only one conductor but several conductors might also be used. In other forms, the bus 40 might also contain more than one wire and have separate wires for power and signal transmission. In addition, the bus system 40 may include interfaces to support external instrumentation including, but not limited to downloads, uploads, software support, development, data logging, and the like, as well as combinations of the foregoing.

Figure 2:
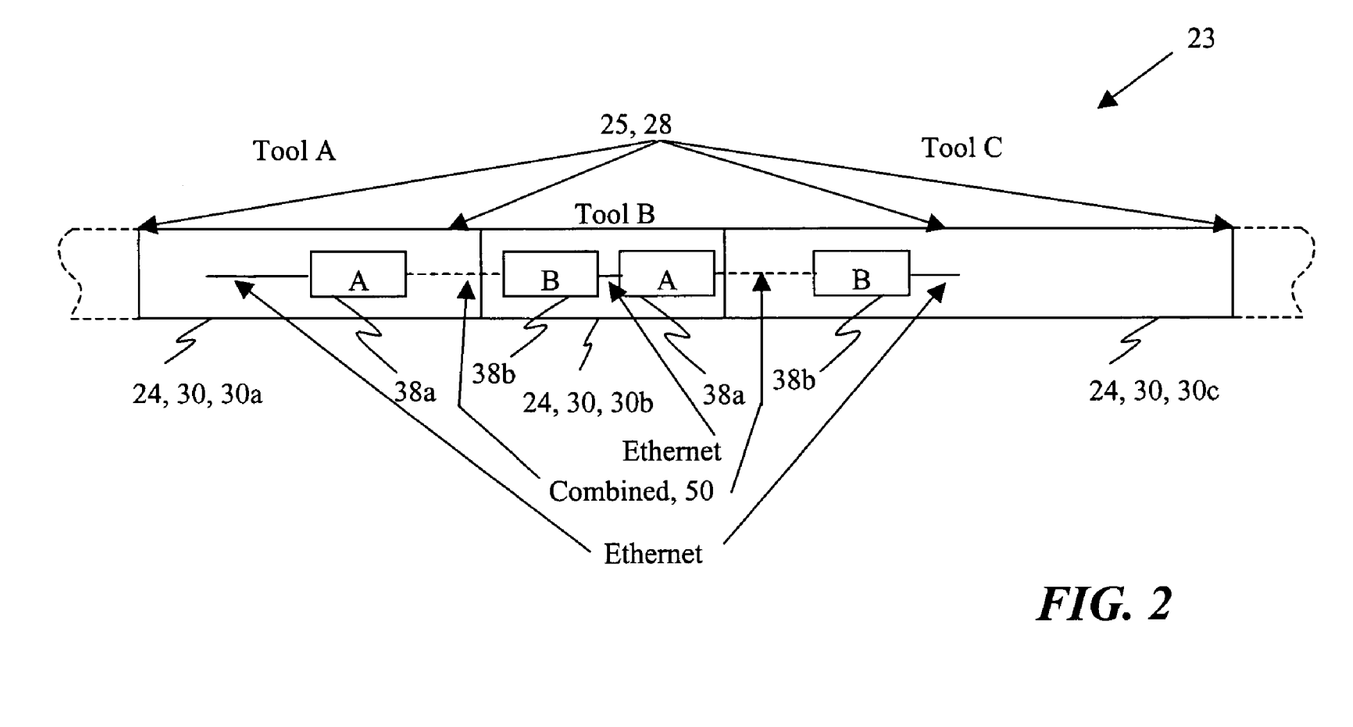
FIG. 2 is an a partial diagrammatic depiction of a down hole assembly depicting one or more tools.
Figure 3:
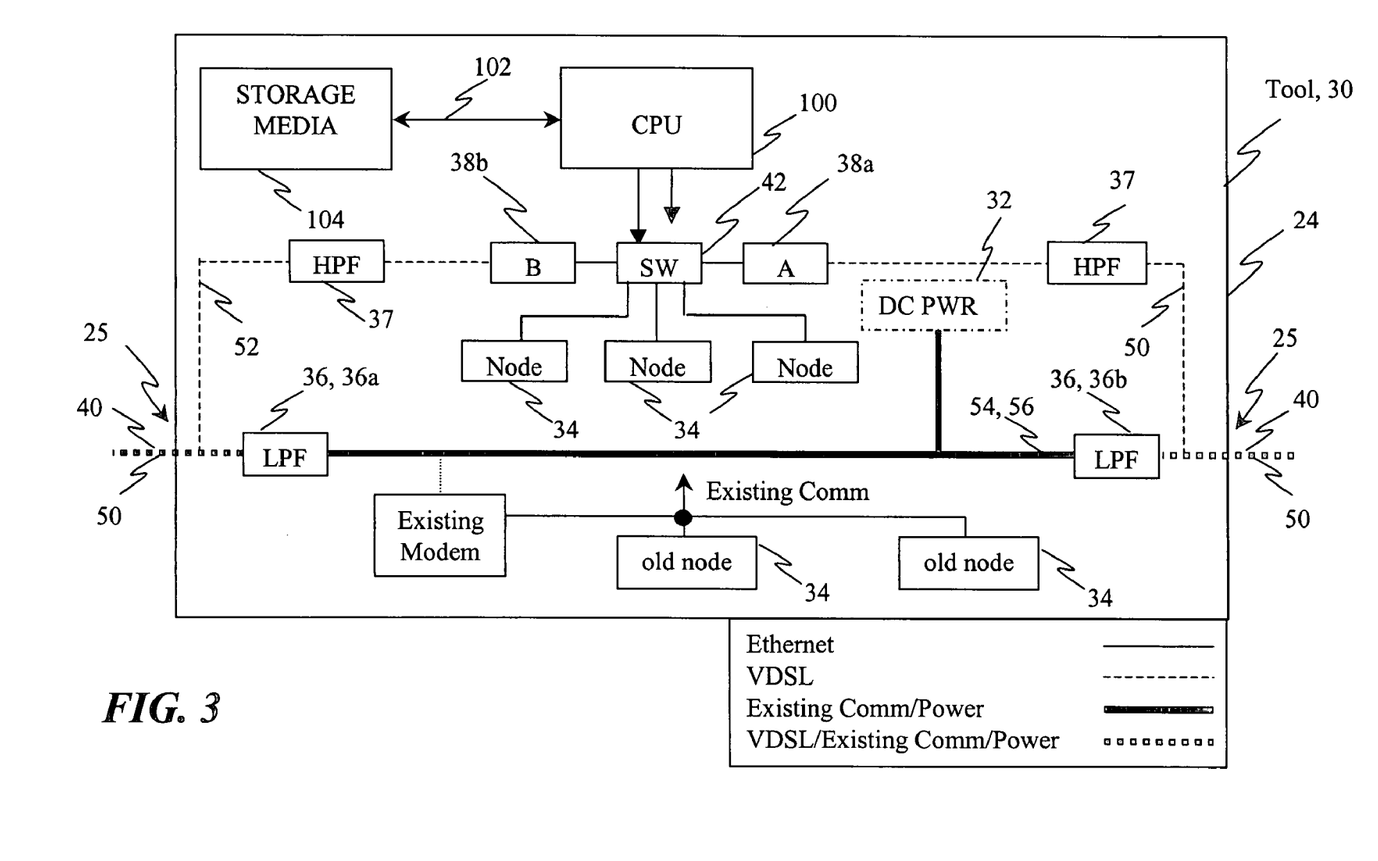
FIG. 3 is a more detailed depiction of an illustrative tool configuration in accordance with an exemplary embodiment.

Turning now to FIGS. 2 and 3 as well, FIG. 2 depicts a partial diagrammatic depiction of a down hole assembly 23 depicting one or more drill collars 24 and tools 30. FIG. 3 provides a more detailed depiction of an illustrative tool 30 configuration. In an exemplary embodiment, in one such tool 30, there is a DC power source 32. This DC power source 32 may be made of batteries or derived from an alternator, and the like. The output of the DC power source 32 is connected to various nodes and circuitry denoted as 34 within that drill collar 24 and/or tool 30. The various nodes 34 may include, but are not limited to various sensors, detectors, actuators, communications interfaces, electronic modules, and the like that a particular tool 30 may employ for various reasons associated with the tool's use in MWD. Similarly, the nodes may be interfaces to a central processing unit (CPU) or controller 100. CPU 100 may be employed for control functions associated with the various nodes as well and data handling and manipulation. Furthermore, CPU 100 may be employed to facilitate control of the exemplary embodiments of the communications systems described herein.

In order to perform the prescribed functions and desired processing, as well as the computations therefore (e.g., facilitate communications among various tools 30, and the like), the CPU 100 may include, but not be limited to, a processor(s), computer(s), memory, storage, register(s), timing, interrupt(s), communication interface(s), and input/output signal interfaces, and the like, as well as combinations comprising at least one of the foregoing. For example, CPU 100 may include signal input/output for controlling of communications switches as described herein. Additional features of CPU 100 and certain processes therein are thoroughly discussed at a later point herein.

The processing performed throughout the communications system 10 may be distributed in a variety of manners. For example, distributing the processing performed in the CPU 100 among the other processors employed may eliminate the need for such a component or process as described or vice versa, combining distributed processes in a single CPU. Each of the elements described herein may have additional functionality that will be described in more detail herein as well as include functionality and processing ancillary to the disclosed embodiments. As used herein, signal connections may physically take any form capable of transferring a signal, including, but not limited to, electrical, optical, or radio.

It will further be appreciated that while particular types of nodes 34 including sensors and similar devices are enumerated to describe an exemplary embodiment, such nodes 34 are described for illustration only and are not limiting. Numerous variations, substitutes, and equivalents will be apparent to those contemplating the disclosure herein. Any device and/or nomenclature that can be utilized to measure equivalent or similar parameters or provide similar functionality is also contemplated.

In addition, the DC power from the power source 32 needs to be transmitted to various other nodes 34 in other tools 30. Various nodes 34 in a given tool 30 e.g., tool A 30a need to communicate with nodes 34 of another tool 30 e.g., tool B 30b. Therefore, the various nodes 34 need to pass a message through the drill collar joint 25 to another tool 30. In addition, as stated above, power generated by the DC power source 32 is also transmitted to various tools 30 via the drill collar joint 25.

Communication across the connection contract ring(s) 28 between drill collars 24 and/or tools 30 at the drill collar joint 25 is accomplished employing a variety of communications schemes. As discussed earlier, each of these schemes while adequate for their intended purposes lacks the bandwidth and integrity desired for the ever-increasing needs of the art. For example, current communication across the drill collar joint 25 may employ a frequency shift keying (FSK) modulation scheme.

In an exemplary embodiment, a system 10 and methodology for communication employing a xDSL modem transceiver denoted herein as modem 38 for communication across drill collar joint 25 is disclosed. In an exemplary embodiment the xDSL modem output, in one instance, communication signal 52 is combined with a power signal 54 and existing communications signals 56 superimposed thereon for communication across a drill collar joint 25. The combined signal 50 (communications signal, existing communication signal and DC power) is then connected to the contact ring of the drill collar 24 for communication to another drill collar 24 and/or tool 30. The combined signal 50 enters an adjoining drill collar 24 through the insulated contact ring 28. The combined communication signal 50 is then decomposed for disbursement throughout this tool 30.

In an exemplary embodiment a first portion of the decomposition is accomplished by passing the combined signal 50 through the low pass filter 36, denoted 36a in this instance, to isolate the communication signal 52 from the DC power 54 and the existing communication signals 56. Filter 36 attenuates noise and higher frequency information in a selected frequency range, and particularly in the frequency range of the xDSL modem 38. Once the DC power passes through the low pass filter 36 it is able to power the internal nodes 34 and circuitry of this tool 30 (with any higher frequency information attenuated by the filter 36).

Similarly, in an exemplary embodiment, the combined signal 50 is also passed through a high pass filter 37 for isolation of the communication signal 52 from the combined communication signal 50, and in particular, the DC power 54 and existing communication signal 56. The communication signal 52 is then transmitted to the xDSL modem 38. This xDSL modem 38 demodulates the communication signal 52 and passes the information therein on to internal nodes 34 of this drill collar 24 and/or tool 30 for processing. Likewise, when the xDSL modem 38 is transmitting a communication signal 52 to be combined with the DC power signal 54 and existing communications signal 56 i.e. for transmission to an adjacent drill collar 24 and/or tool 30, a high pass filter 37 is employed to provide the above-mentioned isolation.

Continuing with the figure, in an exemplary embodiment, Ethernet is employed for intratool communication. However, it will be appreciated that numerous communication protocols including those described herein, may readily be employed including common serial communication techniques. It should be appreciated that it is possible the combined communication signal 50 or existing communication signal 56 includes content not intended for a node 34 in this particular drill collar 24 and/or tool 30 but for a node 34 in another drill collar 24 and/or tool 30. Therefore, this signal line is additionally connected to the contact ring 28 at the far end of the drill collar 24. Similarly, it is further possible, that the DC power 54 may need to be directed to yet another drill collar 24 and/or tool 30 similar to the combined communication signal 50 or existing communication signal 56. Furthermore, it should also be appreciated that it is possible the nodes 34 and circuitry in this drill collar 24 and/or tool 30 may potentially create noise that may couple to the power and communication signal 50, 52, 54, and 56. The nodes 34 may be noise generating, and therefore, it is preferable to eliminate or reduce the noise before it is coupled to the communication signal 50 and transmitted to another drill collar 24 and/or tool 30 via the contact rings 28 at the drill collar joint 25. Therefore, the DC power signal with superimposed existing communication signal 56 is directed once again through another low pass filter 36 before connecting to the other contact ring 28 at the other end of the drill collar 24. This approach of signal separation and combination may readily be repeated for each drill collar. When a node 34 in another drill collar 24 and/or tool 30 has processed the incoming signal and needs to respond to the node 34 issuing the signal, the transmission process is substantially analogously reversed.

Continuing now with FIG. 3 for additional detail regarding an exemplary embodiment employing the xDSL modem 38. In an exemplary embodiment the xDSL modem 38 may be configured and partitioned into substantially two effectively equivalent portions, a first denoted A 38a and a second denoted B 38b. An A modem 38a will transmit data in first frequency and receive data in a second frequency. Similarly, a B modem 38b may be configured to receive data in the first frequency and transmit data in the second frequency. It should also be appreciated that there may be instances when an A modem 38*a* becomes a B modem 38*b* and a B modem 38*b* becomes an A modem 38*a*. It should further be appreciated that for the purposes of discussion, the xDSL modem 38 is described as either an A 38*a* or *a* B 38*b*, however, the xDSL modem 38 may be configured/included as an A, a B, or both A and B simultaneously.

In an exemplary embodiment, data transmitted between an A modem 38*a* and a B modem 38*b* is QAM (quadrature amplitude modulation) based VDSL. VDSL communication over a drill collar joint 25 from one tool 30 (e.g. tool A 30*a*) to another requires an A modem 38*a* in one drill collar 24 and/or tool 30 (e.g. tool A 30*a*) to communicate with a B modem 38*b* in the adjoining tool 30 (e.g. tool B 30*b*). In tool strings 23 made up of more than two drill collars 24 and/or tools 30, the in-between tool would require both an A modem 38*a* and a B modem 38*b* circuit. In other words, each collar joint 25 requires an A modem 38*a*/B modem 38*b* pair. For example, in a tool string 23 as depicted in FIG. 2 made up of tools 30 denoted A, B & C 30*a*, 30*b*, and 30*c* sequentially connected, tool A 30*a* would require at least an A modem 38*a* circuit, tool B 30*b* would require a B modem 38*b* and an A modem 38*a* circuit, and tool C 30*c* would require at least a B modem 38*a* circuit.

Continuing with FIGS. 2 and 3, communication between various nodes 34 as well as with the modem 38 is accomplished via an Ethernet network as part of bus 40. In an exemplary embodiment, input/output is Ethernet 10BaseT per common standard IEEE 802.3. Similarly, the system supports full duplex Ethernet at 10 Mbps. Furthermore, in an exemplary embodiment, the A modem 38 of tool A 30 and the B modem 38*b* of tool B 30 make up a dedicated local area network (LAN). Likewise, the A modem 38*a* of tool B 30*b* and the B modem 38*b* of tool C 30*c* also make up a dedicated LAN. It will be appreciated that the LAN of tools A/B 30 cannot be directly connected to the LAN of tools B/C 30. Therefore, in order for tool A 30*a* to communicate with tool C 30*c* an Ethernet switch 42 circuit is employed to couple the signal from the tool A/B LAN to the tool B/C LAN. For example for the configuration depicted in FIG. 2, this switch resides in the tool B 30*b* between the B modem 38*b* and the A modem 38*a*. The Ethernet output of the B modem 38*b* circuit in tool B 30*b* is connected to one port of the Ethernet switch 42 and the Ethernet output port of the A modem 38*a* circuit in tool B 30*b* is connected to another port of the Ethernet switch 42. It will further be appreciated that the Ethernet switch 42 may very well include multiple ports as depicted for connection to various nodes 34. This allows Ethernet nodes inside a tool 30 to connect to the high speed bus 40.

As described earlier herein, to maintain a single contact conductive ring 28 at the drill collar joint 25 the VDSL communications signal 52 is combined with an existing communications signal 56 and the DC power signal 54 to form a combined signal 50. To facilitate the combination of signals and decomposition of a combined signal 50, a low pass filter (LPF) 36 is employed in series with the signal line carrying the combined signal 50. A first LPF denoted 36*a* in this instance, decomposes an incoming combined signal 50 to drill collar 24 and/or tool 30 (tool B for instance) to separate the power signal 54 with superimposed existing communications signal 56 from the communications signal 52 in the vicinity of the collar joint 25 and before any existing communications or power circuitry. The separated power signal 54 with superimposed existing communications signal 56 is now communicable about the drill collar 24 and/or tool 30 without the communications signal 52. Similarly, another LPF denoted 36*b*, in this instance, is employed for "outgoing" (e.g. communication between tool B and tool C) power signal 54 and existing communications signal 56 prior to combination with a communications signal 52 from the DSL modem 38, 38*b* in this instance. The LPF 36 serves two functions. It keeps the communications signal 52 from corrupting the existing communication signal 56 and it keeps any high frequency noise on the power signal 54 from corrupting the communications signal 52. It is important to note that all existing and new circuit elements preferably tap into the DC power signal 54 somewhere in between the two LPFs 36*a* and 36*b* of the drill collar 24 and/or tool 30. Thus, all power 54 and existing communications signals 56 and circuits are isolated from the higher frequency communications signals 52. Likewise, all power line switches/circuit breakers are preferably placed in between the two LPFs 36*a* and 36*b*. Advantageously the exemplary embodiment described herein is configured to include integrating existing nodes 34 and new nodes 34 in the drill collar and/or tool 30. This approach facilitates a transition to new tool configurations with new nodes 34 while existing nodes 34 are phased out.

Figure 4:
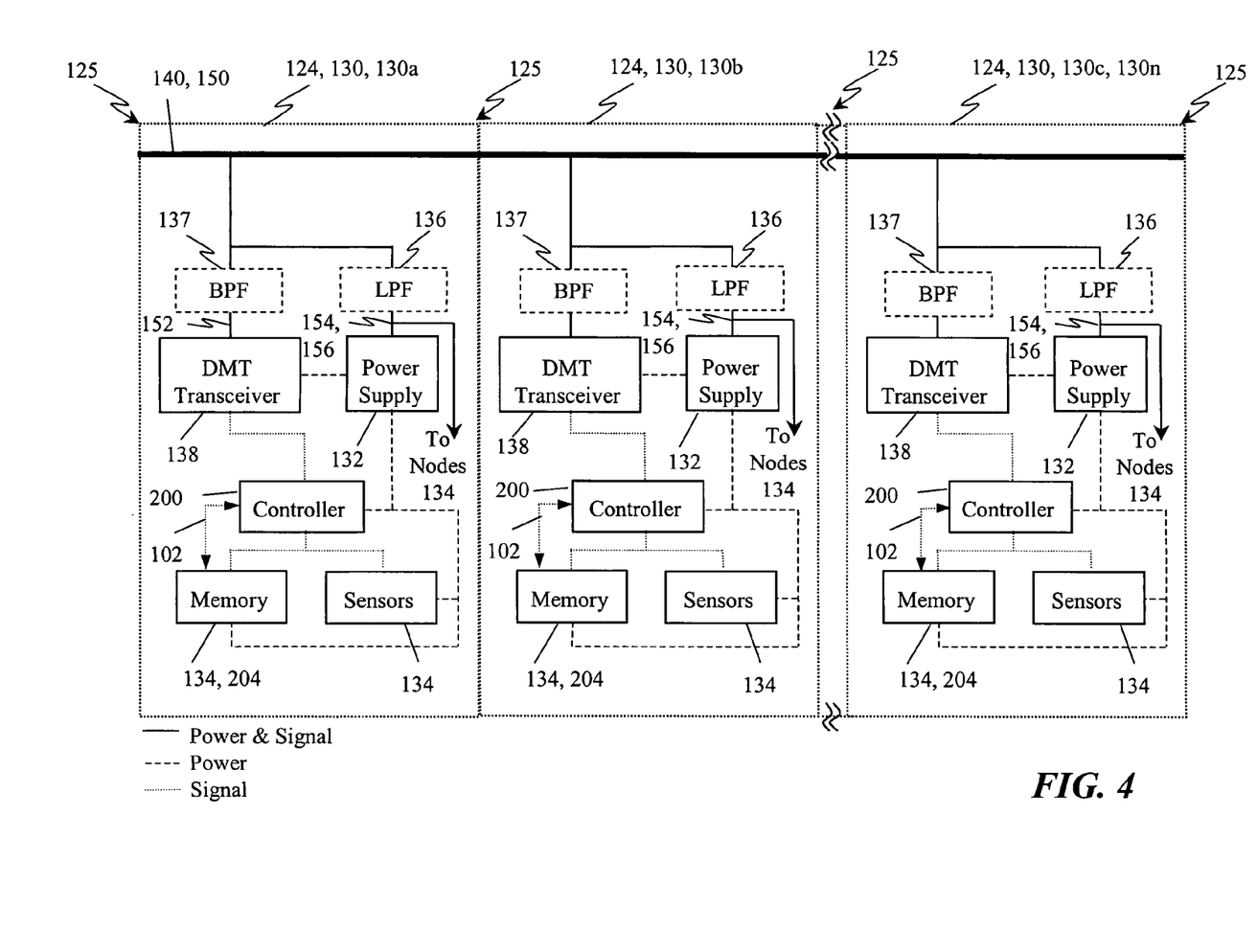
FIG. 4 depicts a simplified block diagram illustrating a tool string in accordance with another exemplary embodiment.

Turning now to FIG. 4, another exemplary embodiment of a communication system 110 is depicted. FIG. 4 depicts a simplified block diagram illustrating a tool string 123 in accordance with another exemplary embodiment. It will be appreciated that in the figure, similar elements between the exemplary embodiments employ the same references numeral as previous exemplary embodiments increased by one hundred. In this instance, each drill collar 124 and/or tool 130, also denoted as 130*a*, 130*b*, and 130*c*, 130*n* may contain one or more Discrete Multi-Tone (DMT) transceivers 138 and additional circuitry that are connected to a bus system 140 for power and/or signal transmission. It will be appreciated that n tools are depicted to indicate that a tool string 123 could contain any number of drill collars 124 and/or tools 130.

Once again, one or more physical or logical nodes 134 e.g., sensors, actuators, processors and the like, may be connected to a DMT transceiver 138. Also, once again, each drill collar 124 and/or tool 130 may employ separate wiring for communications between internal nodes 134. In one exemplary embodiment, a power source 132 in at least one tool 130 of a tool string 123 is used for, but not limited to, supplying various nodes 134 including, but not limited to, a controller 200, memory and storage 204 and sensors. The CPU/controller(s) 200 initiate signal transmission between the drill collars 124 and/or tools 130. Similar to earlier embodiments, the transmitted data may be derived from sensor measurements, memory content or any application for which the controller 200 and particular tool 130 is employed.

Each DMT transceivers 138 for each tool 130 is attached to a shared medium e.g., bus 140 for communication across the drill collar joints 125 of the drill collars 124 via conductive rings 128 between respective transceivers 138. In instances where attenuation may become too high for transmission, such as with a long tool string 123, in another exemplary embodiment, one or more intermediate transceivers e.g., 138 may be employed as proxies with the controller 200 of a selected tool 130 operating to facilitate communications routing.

Advantageously, the DMT transceivers 138 of an exemplary embodiment are designed and configured for a shared communications medium e.g., bus 140. In one exemplary embodiment, a combined signal 150, including, but not limited to one or more of a communications signal 152, a power signal 154 and an existing communications signal 156 may all be transmitted simultaneously on bus 140. Thus, advantageously, in this exemplary embodiment, there is no need to introduce filters in the bus 140 as employed in other embodiments. Furthermore, it is possible, but not mandatory, to insert a low pass filter 136 at the input of the power source 132 for decoupling the DC power signal 154. It is also possible, but not mandatory, to employ a band pass filter or high pass filter 137 at the input of the DMT transceivers 138 in order to suppress out-of-band noise and thereby improve the quality of the received communication signal e.g., 152.

The communication system 110, in one other exemplary embodiment, utilizes the DMT modulation scheme, also known as OFDM (Orthogonal Frequency Division Multiplexing). This bandwidth efficient modulation scheme offers significant advantages for communications in harsh communication environments experienced in down-hole applications. OFDM permits relatively easy equalization, enhanced immunity to impulsive noise and the possibility to adapt communication to the channel properties.

In an exemplary embodiment, the DMT transceivers 138 employ 128 or 256 subchannels in the baseband with an overall bandwidth of several megahertz (MHz) allowing for data rates of several mega bits per second (Mbps). It should readily be appreciated that other variations for numbers of subchannels, different bandwidths, and frequency allocations are also possible. The communication system 110 may also be configured to operate in various communication modes including, but not limited to master-slave or multi-master mode with half-duplex operation. It is also possible to divide the bandwidth and use fixed or dynamic allocation of subchannels in order to allow full duplex operation.

In yet another exemplary embodiment, the communication system 110 may employ forward error correction (FEC) to enhance the data reliability. Furthermore, the subchannels may be modulated using various modulation techniques including, but not limited to, PSK (phase shift keying) or QAM (quadrature amplitude modulation). The communication system 110 may also be configured to adapt the transmission to the channel conditions. Thus, it may use all carriers or only a subset, define a selected modulation type such as, but not limited to binary phase shift keying (BPSK), quadrature phase shift keying (QPSK), 16 quadrature amplitude modulation (16 QAM), 64 quadrature amplitude modulation (64 QAM) or which FEC to employ (e.g. rate ½ convolutional encoding, rate ¾ convolutional encoding).

In an exemplary embodiment, data will be sent to and received from the transceivers 138 in packets. These packets may include, but not be limited to, a preamble for synchronization, a header containing source address e.g., particular node 134 of a particular tool 130 and destination address e.g., particular node 134 of a particular tool 130 and a checksum block for error detection. This error detection may be used to facilitate an ARQ (automatic repeat request) scheme.

As the bus 140 inside each drill collar 124 and/or tool 130 of the tool string 123 constitutes a shared medium, the DMT transceivers 138 of an exemplary embodiment, may also employ carrier sense multiple access/collision detection (CSMA/CD) or carrier sense multiple access/collision avoidance (CSMA/CA) for bus 140 access. The DMT transceivers 138 may be configured to send broadcast or multicast messages using a predefined mode of transmission, or unicast messages for a specific node 134 of a particular tool 130. In the later case, communication between various nodes 134 starts with an initialization phase in which both DMT transceivers 138 use a predefined mode of transmission. In this initialization phase, the channel properties are examined by a DMT transceiver 138 established at the receiver side, and based on the result of this examination, the subchannels, the modulation type and the FEC to be used are determined and sent to the DMT transceiver 138 established as a transmitter.

The disclosed invention can be embodied in the form of computer, controller, or processor implemented processes and apparatuses for practicing those processes. The present invention can also be embodied in the form of computer program code containing instructions embodied in tangible media 102, 202 such as floppy diskettes, CD-ROMs, hard drives, or any other computer-readable storage medium, wherein, when the computer program code is loaded into and executed by a computer, controller 100, or processor, the computer, controller, or processor 100, 200 becomes an apparatus for practicing the invention. The present invention may also be embodied in the form of computer program code as a data signal 104, 204 for example, whether stored in a storage medium, loaded into and/or executed by a computer, controller, or processor 100, 200 or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor 100, 200 the computer program code segments configure the processor 100 to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for communication with a downhole tool comprising:
    a first communication transceiver in a first tool for measurement while drilling and a second communication transceiver in at least one of said first tool, a second tool for measurement while drilling, and an external instrumentation interface;
    a bus system comprising a first conductive connection and a second conductive connection in each of said first tool and said at least one of said first tool, a second tool and an external instrumentation interface, said first conductive connection and said second conductive connection of said first tool in operable communication with said first communication transceiver and said first conductive connection and said second conductive connection of said at least one of said first tool, a second tool and an external instrumentation interface also in operable communication with said second communication transceiver;
    wherein said first communication transceiver and said second communication transceiver employ at least one of Quadrature Amplitude Modulation (QAM) and Discrete Multi-Tone (DMT) modulation; and
    wherein said bus system carries a combined communications signal including least one of a modulated communication signal, a power signal, and an existing communications signal.

2. The system of claim 1 wherein each said first conductive connection includes a conductive ring at a drill collar joint and each said second conductive connection includes a pipe.

3. The system of claim 1 wherein said transmitting and receiving is across a drill collar mating contact between adjacent tools downhole for measurement while drilling.

4. The system of claim 1 wherein said first conductive connection includes a conductive drill collar contact ring.

5. The system of claim 1 wherein said second conductive contact includes a mating of a pipe of said first tool and a pipe of said second tool.

6. The system of claim 1 wherein said operable communication includes a single wire for a combined power and communication signal and a pipe for a return.

7. The system of claim 1 further including a power source in operable communications with said bus system and said transceiver respectively.

8. The system of claim 1 further including a node in operable communications with said bus system and said transceiver respectively.

9. The system of claim 7 wherein said operable communications with said transceiver includes Ethernet.

10. The system of claim 1 further including a first filter interposed between said bus system and said first communication transceiver and in operable communication therewith respectively.

11. The system of claim 10 wherein said first filter comprises at least one of a high pass filter and a band pass filter configured to decompose said combined communication signal to yield a first communication signal.

12. The system of claim 1 further including a first low pass filter interposed between said bus system and a power source and in operable communication therewith respectively, wherein said low pass filter is configured to decompose said combined communication signal to yield a power signal and an existing communication signal.

13. The system of claim 1 further including a second low pass filter interposed between said bus system and said communication transceiver and in operable communication therewith respectively, wherein said second low pass filter is configured to isolate a power source and a node from a communications signal.

14. The system of claim 1 wherein said first communication transceiver and said second communications transceiver are Very high speed Digital Subscriber Line (VDSL) modems employing quadrature amplitude modulation.

15. The system of claim 1 wherein said first communication transceiver and said second communications transceiver are discrete multitone transceivers employing Orthogonal Frequency Division Multiplexing (OFDM).

16. The system of claim 15 wherein said first communication transceiver and said second communications transceiver employs at least one of 128 and 256 subchannels in a baseband.

17. The system of claim 15 wherein said first communication transceiver and said second communications transceiver employs subchannels modulated using at least one of phase shift keying (PSK) and quadrature amplitude modulation (QAM).

18. The system of claim 1 wherein said first communication transceiver and said second communications transceiver employ a selected communications mode.

19. The system of claim 18 wherein said first communication transceiver and said second communications transceiver employ at least one of a master-slave and a multi-master communications mode each employing at least one of half-duplex operation with Time Division Multiple Access (TDMA) and full duplex operation employing Frequency Division Multiple Access (FDMA) with at least one of fixed and dynamic allocation of operating frequency ranges.

20. The system of claim 1 wherein said first communication transceiver and said second communications transceiver employs forward error correction (FEC).

21. The system of claim 20 wherein said forward error correction (FEC) includes at least one of rate one half convolutional encoding and rate three quarters convolutional encoding.

22. The system of claim 1 wherein said first communication transceiver and said second communications transceiver employs data packets.

23. The system of claim 22 wherein said data packets include at least one of a preamble for synchronization, a header containing a source address for a selected node of a selected tool, a destination address for another node of a particular tool, and a checksum block for error detection.

24. The system of claim 1 wherein said first communication transceiver and said second communications transceiver employs at least one of carrier sense multiple access/collision detection (CSMA/CD) and carrier sense multiple access/collision avoidance (CSMA/CA).

25. The system of claim 1 wherein said first communication transceiver and said second communications transceiver adapt their transmission mode to conditions of said bus system by selecting at least one of modulation type, forward error correction, (FEC) and frequency ranges employed.

26. A method for communication with a downhole tool comprising:
    formulating a combined communications signal;
    transmitting and receiving a communication signal with a first communication transceiver in a first tool for measurement while drilling and a second communication transceiver in at least one of said first tool, a second tool for measurement while drilling, and an external instrumentation interface;
    utilizing a bus system comprising a first conductive connection and a second conductive connection in each of said first tool and said at least one of said first tool, a second tool and an external instrumentation interface, said first conductive connection and said second conductive connection of said first tool in operable communication with said first communication transceiver and said first conductive connection and said second conductive connection of said at least one of said first tool, a second tool and an external instrumentation interface also in operable communication with said second communication transceiver;
    wherein said first communication transceiver and said second communication transceiver employ at least one of Quadrature Amplitude Modulation (QAM) and Discrete Multi-Tone (DMT) modulation; and
    wherein said combined communication signal includes at least one of a modulated communications signal, a power signal, and an existing communications signal.

27. The method of claim 26 wherein each said first conductive connection includes a conductive ring at a drill collar joint and each said second conductive connection includes a pipe.

28. The method of claim 26 wherein said transmitting and receiving is across a drill collar mating contact between adjacent tools downhole for measurement while drilling.

29. The method of claim 26 further including generating a power signal with a power source in operable communications with said bus system and said transceiver respectively.

30. The method of claim 26 further including communicating with a node in a selected tool.

31. The method of claim 26 further including decomposing said combined communication signal to yield a first communication signal with a first filter.

32. The method of claim 29 wherein said first filter comprises at least one of a high pass filter and a band pass filter interposed between said bus system and said first communication transceiver and in operable communication therewith respectively.

33. The method of claim 26 further including decomposing said combined communication signal to yield a power signal and an existing communication signal.

34. The method of claim 33 wherein said decomposing includes interposing a low pass filter between said bus system and a power source and in operable communication therewith respectively.

35. The method of claim 26 further including isolating a power source and a node from a communications signal with a second low pass filter interposed between said bus system and said communication transceiver and in operable communication therewith respectively.

36. The method of claim 35 wherein said isolating includes interposing a low pass filter between said bus system and a power source and in operable communication therewith respectively.

37. The method of claim 26 wherein said transmitting and receiving includes employing Orthogonal Frequency Division Multiplexing (OFDM).

38. The method of claim 37 wherein said transmitting and receiving employs at least one of 128 and 256 subchannels in a baseband.

39. The method of claim 37 wherein said transmitting and receiving includes modulating subchannels employing at least one of phase shift keying (PSK) and quadrature amplitude modulation (QAM).

40. The method of claim 26 wherein said transmitting and receiving employs a selected communications mode.

41. The method of claim 40 wherein transmitting and receiving employs at least one of a master-slave and a multi-master communications mode each employing at least one of half-duplex operation with Time Division Multiple Access (TDMA) and full duplex operation with at least one of Frequency Division Multiple Access (FDMA) with at least one of fixed and dynamic allocation of operating frequency ranges.

42. The method of claim 26 wherein said transmitting and receiving includes forward error correction (FEC).

43. The method of claim 42 wherein said forward error correction (FEC) includes at least one of rate one half convolutional encoding and rate three quarters convolutional encoding.

44. The method of claim 26 wherein said transmitting and receiving employs data packets.

45. The method of claim 44 wherein said data packets include at least one of a preamble for synchronization, a header containing a source address for a selected node of a selected tool, a destination address for another node of a particular tool, and a checksum block for error detection.

46. The method of claim 26 wherein said transmitting and receiving includes at least one of carrier sense multiple access/collision detection (CSMA/CD) and carrier sense multiple access/collision avoidance (CSMA/CA).

47. The method of claim 26 wherein said first communication transceiver and said second communications transceiver adapt their transmission mode to conditions of said bus system by selecting at least one of modulation type, forward error correction, (FEC) and frequency ranges employed.

48. A storage medium encoded with a machine-readable computer program code, said code including instructions for causing a computer to implement a method for communication with a downhole tool, the method comprising:
   formulating a combined communications signal;
   transmitting and receiving a communication signal with a first communication transceiver in a first tool for measurement while drilling and a second communication transceiver in at least one of said first tool, a second tool for measurement while drilling, and an external instrumentation interface;
   utilizing a bus system comprising a first conductive connection and a second conductive connection in each of said first tool and said at least one of said first tool, a second tool and an external instrumentation interface, said first conductive connection and said second conductive connection of said first tool in operable communication with said first communication transceiver and said first conductive connection and said second conductive connection of said at least one of said first tool, a second tool and an external instrumentation interface also in operable communication with said second communication transceiver;
   wherein said first communication transceiver and said second communication transceiver employ at least one of Quadrature Amplitude Modulation (QAM) and Discrete Multi-Tone (DMT) modulation; and
   wherein said combined communication signal includes at least one of a modulated communications signal, a power signal, and an existing communications signal.

49. A system for communication with a downhole tool comprising:
   a means for formulating a combined communications signal;
   a means for transmitting and receiving a communication signal with a first communication transceiver in a first tool for measurement while drilling and a second communication transceiver in at least one of said first tool, a second tool for measurement while drilling, and an external instrumentation interface;
   a means for utilizing a bus system comprising a first conductive connection and a second conductive connection in each of said first tool and said at least one of said first tool, a second tool and an external instrumentation interface, said first conductive connection and said second conductive connection of said first tool in operable communication with said first communication transceiver and said first conductive connection and said second conductive connection of said at least one of said first tool, a second tool and an external instrumentation interface also in operable communication with said second communication transceiver;
   wherein said first communication transceiver and said second communication transceiver employ at least one of Quadrature Amplitude Modulation (QAM) and Discrete Multi-Tone (DMT) modulation; and
   wherein said combined communication signal includes at least one of a modulated communications signal, a power signal, and an existing communications signal.

* * * * *